(12) United States Patent
Martineau et al.

(10) Patent No.: US 7,418,806 B2
(45) Date of Patent: Sep. 2, 2008

(54) FRAME FOR SUPPORTING AN ARTICLE AND A METHOD OF FORMING A CORNER OF THE FRAME

(75) Inventors: Robert C. Martineau, Rice Lake, WI (US); Brian Jensen, Cameron, WI (US)

(73) Assignee: Quanex Corporation, Houston, TX (US)

( * ) Notice: Subject to any disclaimer, the term of this patent is extended or adjusted under 35 U.S.C. 154(b) by 653 days.

(21) Appl. No.: 11/131,546

(22) Filed: May 18, 2005

(65) Prior Publication Data

US 2005/0257496 A1 Nov. 24, 2005

Related U.S. Application Data

(60) Provisional application No. 60/572,545, filed on May 19, 2004.

(51) Int. Cl.
*E04C 2/38* (2006.01)
(52) U.S. Cl. ........................................ 52/658; 52/656.9
(58) Field of Classification Search ................ 52/656.1, 52/656.5–656.9, 658, 631, 718.04, 664, 663, 52/786.13, 455; 403/205, 295, 388, 231, 403/401, 403, 382; 29/897.312, 458; 228/142, 228/143; 160/381; 49/504
See application file for complete search history.

(56) References Cited

U.S. PATENT DOCUMENTS

| | | | |
|---|---|---|---|
| 1,030,694 A * | 6/1912 | Watson et al. | ................ 160/381 |
| 1,596,950 A | 8/1926 | Semonin | |
| 2,094,991 A | 10/1937 | Lang | |
| 2,097,927 A | 11/1937 | Klemp | |
| 2,185,904 A | 1/1940 | Stowe | |
| 2,703,159 A * | 3/1955 | Van Fleet | ................... 52/656.5 |
| 2,952,342 A | 9/1960 | Schnittker | |
| 3,097,684 A | 7/1963 | Le Tarte | |
| 4,222,209 A | 9/1980 | Peterson | |
| 4,357,744 A | 11/1982 | McKenzie et al. | |
| 4,479,737 A * | 10/1984 | Bergh et al. | ................. 403/382 |
| 4,503,640 A | 3/1985 | Stern | |
| 4,530,195 A | 7/1985 | Leopold | |
| 4,562,677 A | 1/1986 | Hrabák | |

(Continued)

OTHER PUBLICATIONS

U.S. Appl. No. 11/131,977, filed May 18, 2005, Title "A Screen Assembly and Method Of Attaching A Screen Cloth Therein Using A Light Curable Adhesive".

*Primary Examiner*—Richard Chilcot
*Assistant Examiner*—Bryan Eppes
(74) *Attorney, Agent, or Firm*—Howard & Howard Attorneys, P.C.

(57) ABSTRACT

A frame (20) for supporting an article includes a first frame section (36) and a first flange (62) extending to a first end (56). The frame (20) also includes a second frame section (38) and a second flange (64) extending to a second end (60). A notch (68) is formed in the first flange (62) and defines a flange finger (70) between the notch (68) and the first end (56). A retention opening (32) is formed in the second end (60) of the second frame section (38). A retention corner (94) for the frame (20) is formed between the first frame section (36) and the second frame section (38) by inserting the flange finger (70) of the first frame section (36) into the retention opening (32) of the second frame section (38).

12 Claims, 9 Drawing Sheets

U.S. PATENT DOCUMENTS

| | | |
|---|---|---|
| 4,628,582 A | 12/1986 | Leopold |
| 4,747,248 A * | 5/1988 | Fahs .......................... 52/455 |
| 4,968,366 A | 11/1990 | Hukki et al. |
| 5,018,263 A | 5/1991 | Stern |
| 5,203,069 A | 4/1993 | Hennig |
| 5,881,525 A | 3/1999 | Reigelman et al. |
| 5,921,037 A | 7/1999 | Minter |
| 6,681,833 B2 | 1/2004 | Wylie |
| 6,746,175 B1 | 6/2004 | Gonnerman et al. |
| 7,223,044 B2 * | 5/2007 | Quintile ...................... 403/402 |

* cited by examiner

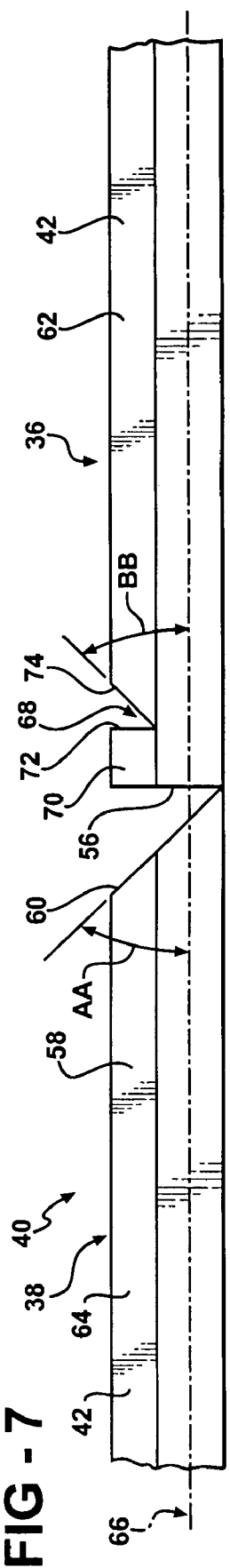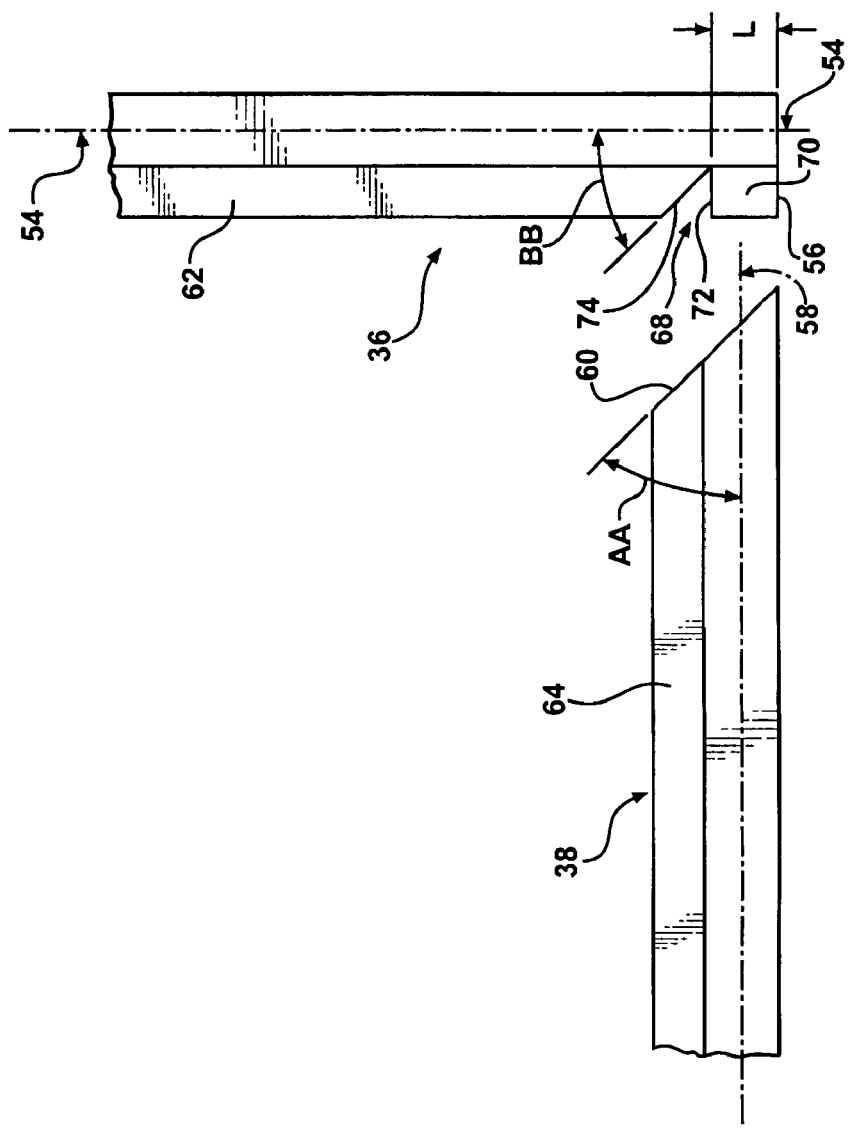
FIG-7
FIG-8

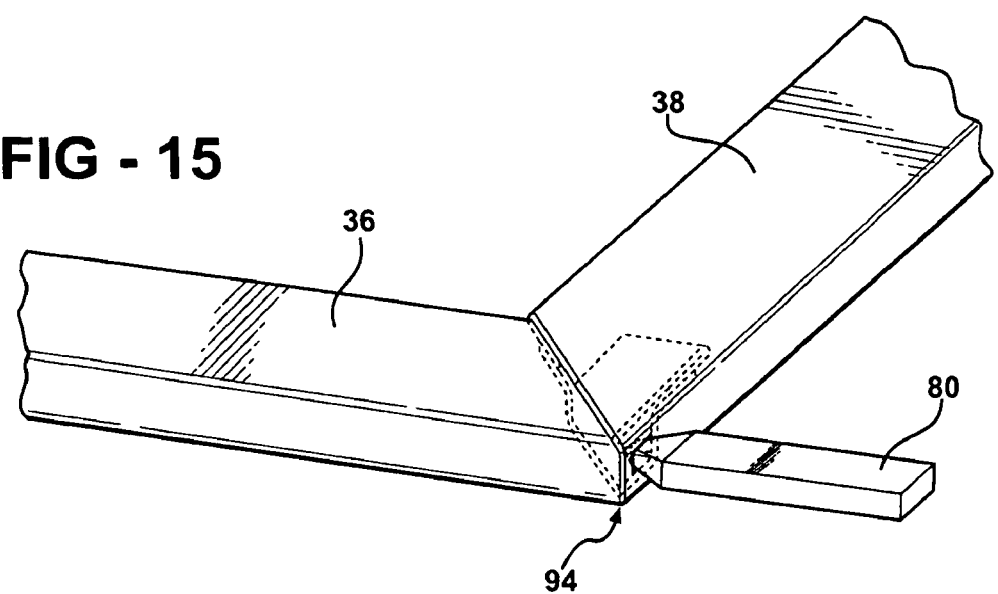
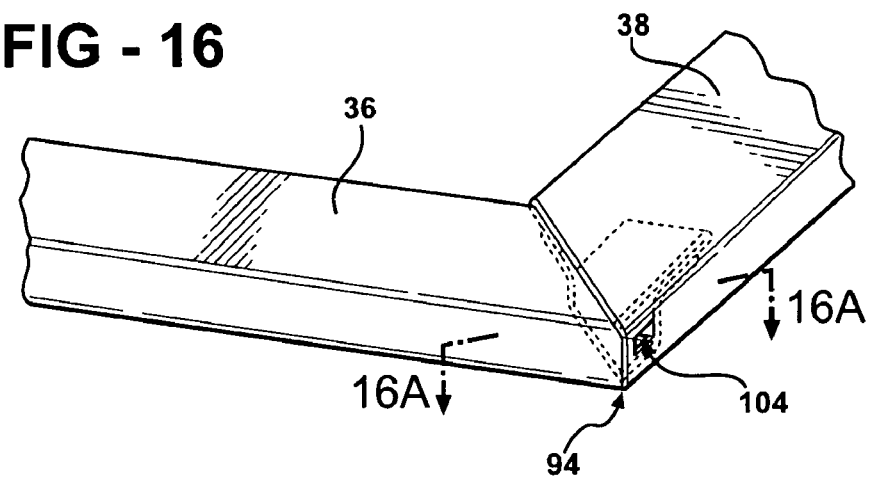
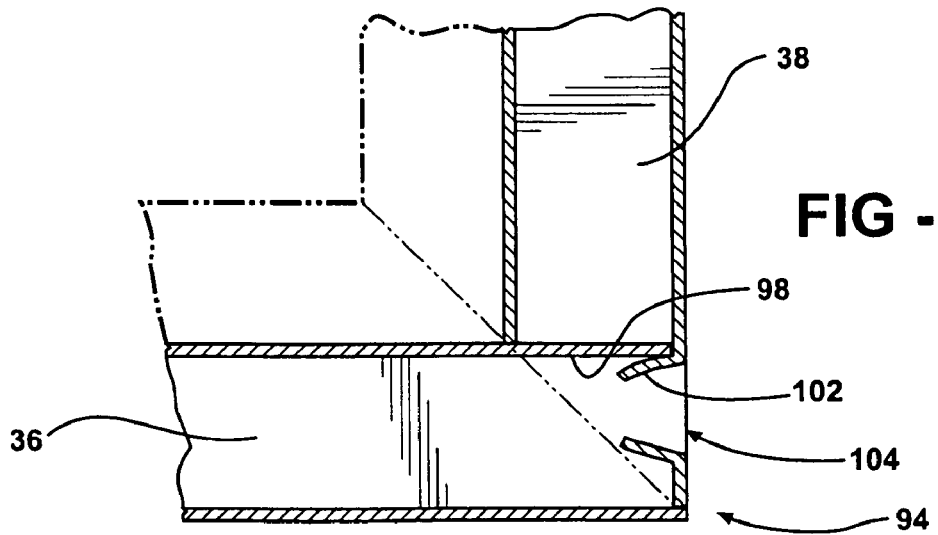

FRAME FOR SUPPORTING AN ARTICLE AND A METHOD OF FORMING A CORNER OF THE FRAME

CROSS REFERENCE TO RELATED APPLICATION

This application claims the benefit of U.S. provisional patent application Ser. No. 60/572,545 filed on May 19, 2004.

BACKGROUND OF THE INVENTION

1. Field of the Invention

The invention generally relates to a frame and a method of forming a corner of the frame. More specifically, the invention relates to joining the frame at a corner without the use of fasting devices.

2. Description of the Related Art

Traditional frames, such as those for windows or doors which support a screen cloth or a pane of glass, are formed from four sides that are connected to form four corner joints. The sides surround an open space of the frame and, in traditional frames, the sides are secured together at the corner joints using welds or other fasteners, such as a corner lock or a corner key.

Some frames have been constructed from a single continuous frame section having one corner joint instead of using separate sides that are each connected to form four separate corner joints. One such frame is disclosed in U.S. Pat. No. 5,881,525 to Riegelman et al. (the '525 patent). The '525 patent discloses a continuous frame section formed from a flat strip of metal that is folded over onto itself to define a hollow tube and a flange extending from the tube. A square end and a mitred end are formed at opposite ends of the continuous frame section. A mitre cut, a square cut, a locking tab, and a locking strip are formed at three locations along the continuous frame section. Additionally, two locking holes are defined by the hollow tube near opposite ends of the continuous frame section. The continuous frame section is folded at each of the mitre cuts to bring the square cuts within the mitred cuts and define three fold corners. The locking tab engages, and is retained within, the locking strip for each fold corner. An L-shaped bracket, i.e., a corner lock or corner key, is used to bring the opposing ends of the continuous frame section together to form the fourth corner joint, i.e., a locking corner. The bracket includes arms and hooks that extend from the fourth corner joint at a 90 degree angle. An arm and a corresponding hook are inserted into the mitred end. Next, the other arm and corresponding hook are inserted into the beveled end where the beveled end is brought over the square end. After insertion of the arms and corresponding hooks, a hook engages each of the locking holes to bring the opposing ends together and lock the fourth corner. Accordingly, this type of fourth corner requires an additional piece, i.e., the L-shaped bracket, to complete the frame. Without the L-shaped bracket, the frame cannot be locked at the fourth corner. This added piece adds additional cost to assembling the frame due to the additional time and material associated with the L-shaped bracket.

Other frames have been constructed from a single continuous frame section, folded upon itself, to form the corner joint. One such frame is disclosed in U.S. Pat. No. 2,952,342 to Schnittker (the '342 patent). The '342 patent discloses a continuous frame section formed from a flat strip of metal that is folded over onto itself to define a hollow tube and a flange extending from and along the tube. Mitre cuts are formed at three spaced locations along the continuous frame section. An insertion tab extends from a first end of the continuous frame section and a locking tab extends from a second end of the continuous frame section. Additionally a locking slot is defined in the continuous frame section, adjacent the locking tab. The continuous frame section is folded about each of the mitre cuts to form three fold corners and the ends are brought together to form the corner joint. When the ends are brought together, the insertion tab is inserted into the locking slot, and the locking tab and the insertion tab are bent away from each other to "lock" the frame together at the fourth corner. The additional steps of bending each of the tabs is cumbersome and, therefore, adds additional time to assemble the frame which translates into additional cost to manufacture the frame.

Accordingly, it would be advantageous to produce a frame where the corner joint is formed by only bringing the ends together where fasteners, such as locking keys, and/or additional steps, such a bending locking tabs are eliminated. Elimination of these parts or steps would save time and cost to manufacture the frames.

SUMMARY OF THE INVENTION AND ADVANTAGES

A frame according to the present invention is disclosed. The frame supports an article and comprises a first frame section extending along a first axis to a first end. A first flange extends laterally from the first frame section and along the first axis to the first end. The first end extends perpendicular to the first axis across the first frame section and the first flange. A second frame section extends along a second axis to a second end. A second flange extends laterally from the second frame section and along the second axis to the second end. The second end extends at an acute angle relative to the second axis, across the second frame section and the second flange. The second end defines a retention opening extending into the second end of the second frame section. A notch is formed in the first flange, proximate the first end, and defines a flange finger disposed between the notch and the first end. A retention corner is formed between the sections by inserting the flange finger into the retention opening of the second end.

A method of forming the retention corner of the frame is also disclosed. The method comprises the steps of forming the notch in the first flange, proximate the first end, to define the flange finger disposed between the notch and the first end and also the step of inserting the flange finger into the retention opening to form the retention corner of the frame.

By forming a retention corner between the sections of the frame by inserting the flange finger into the retention opening, fasteners, such as locking keys, or additional steps such as bending of tabs, are not required. The flange finger is inserted into the retention opening and is retained in the retention opening after insertion. Therefore, by not requiring fasteners or additional steps to fasten the retention corner of the frame, time and the cost to manufacture the frames are reduced.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 6a is a cross-section of the hollow rectangular tube taken along line 6-6 in FIG. 5 showing a lap-joint;

FIG. 6b is a cross-section of an alternative hollow rectangular tube taken along line 6a, 6b-6a, 6b in FIG. 5 showing a butt-joint;

FIG. 7 is a side view of a first frame section and a second frame section establishing a continuous frame section extending along a common axis;

FIG. 8 is a side view of the first frame section and the second frame section illustrating the insertion of a flange finger into a retention opening to form a retention corner of the frame;

FIG. 15 is a perspective view of the retention corner of the frame with the first frame section and the second frame section connected to form the retention corner and showing in hidden lines the flange finger inserted into the retention opening and illustrating the punch forming a puncture hole in the second frame section;

FIG. 16 is a perspective view of the retention corner of the frame with a flap from the puncture hole bent to secure the first and second frame sections; and FIG. 16a is a cross-sectional top view of the retention corner taken along line 16A-16A illustrating the flap from the second frame section abutting a wall of the first frame section to secure the first and the section frame sections together.

DETAILED DESCRIPTION OF THE INVENTION

The present invention is a frame 20 for supporting an article 22. The frame is shown generally at 20. One type of frame 20 is for insertion into a window or a door where the frame 20 supports a screen cloth as the article 22, shown in FIGS. 1 and 2. However, it should be understood that the frame 20 can be formed for any desired application and for supporting any desired article 22. For example, the frame 20 can be a picture frame supporting a pane of glass and/or a picture as the article 22.

Figure 1:
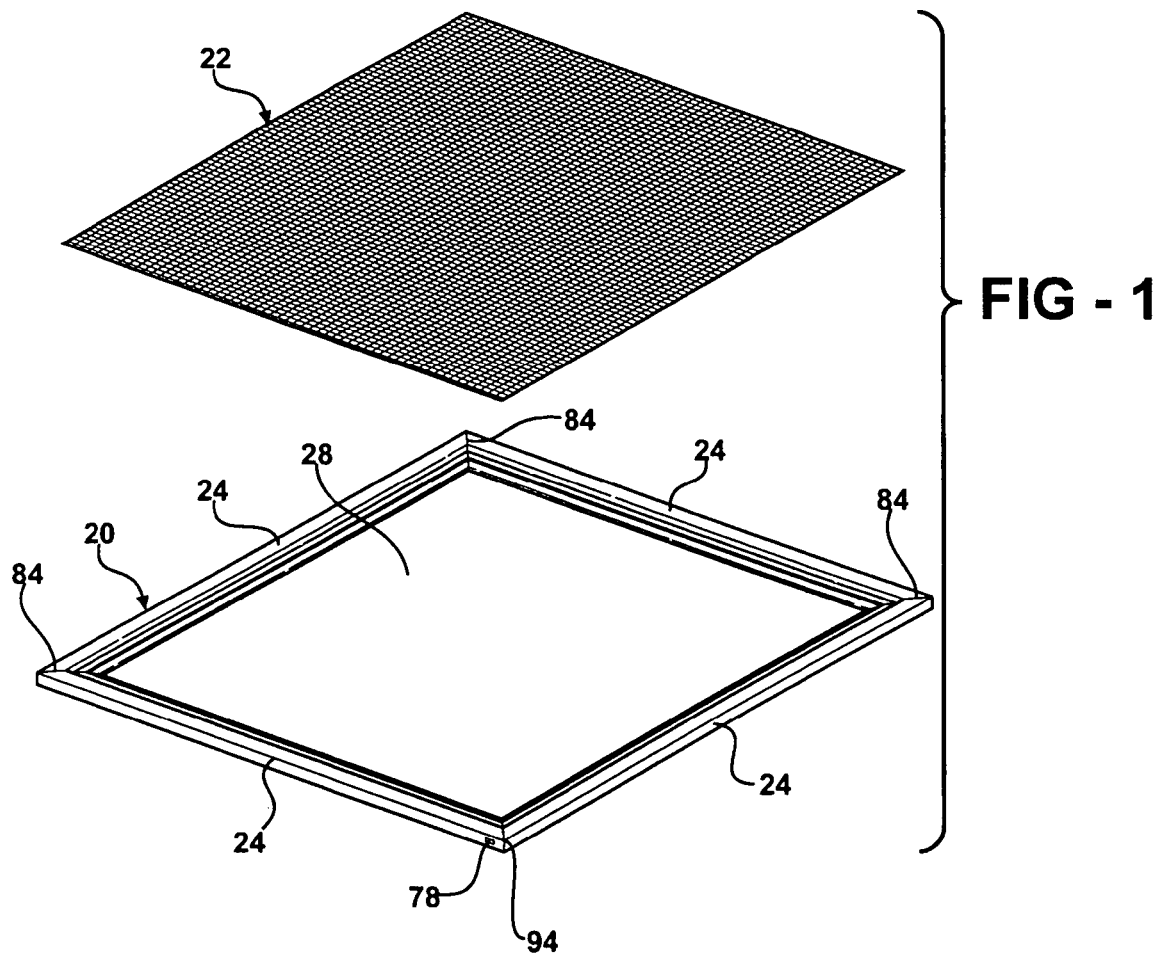
FIG. 1 is an exploded perspective view of a frame surrounding an open space and supporting screen cloth.
Figure 2:
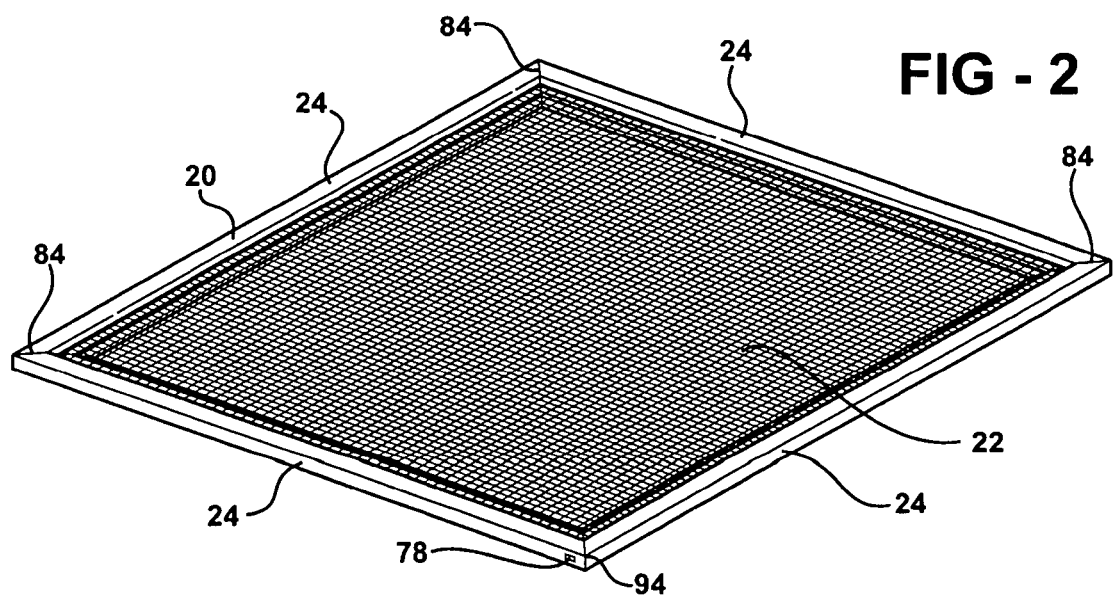
FIG. 2 is a perspective view of the frame of FIG. 1 with the screen cloth assembled to the frame and covering the open space.

Referring to FIGS. 1 and 2, the frame 20 includes three or more sides 24 where the sides 24 surround an open space 28 of the frame 20. The open space 28 is merely the area within boundaries established by the sides 24 of the frame 20. Although the sides 24 surround the open space 28, it should be understood that "surrounding" does not require complete enclosure of a perimeter of the open space 28. While the frame 20 preferably includes four sides 24 that are connected to form an enclosed rectangular shape surrounding the open space 28, it should be understood that the frame 20 can also include more or less sides 24 such as three side 24 that are connected to form a triangular shape, for example, or even three sides 24 of a rectangular shape that partially surround the open space 28. Other configurations of the sides 24 are also possible. Additionally, the perimeter is not limited to the rectangular shape, but can be any shape that is desired (e.g. circular, triangular, octagonal, etc.).

Figure 3:
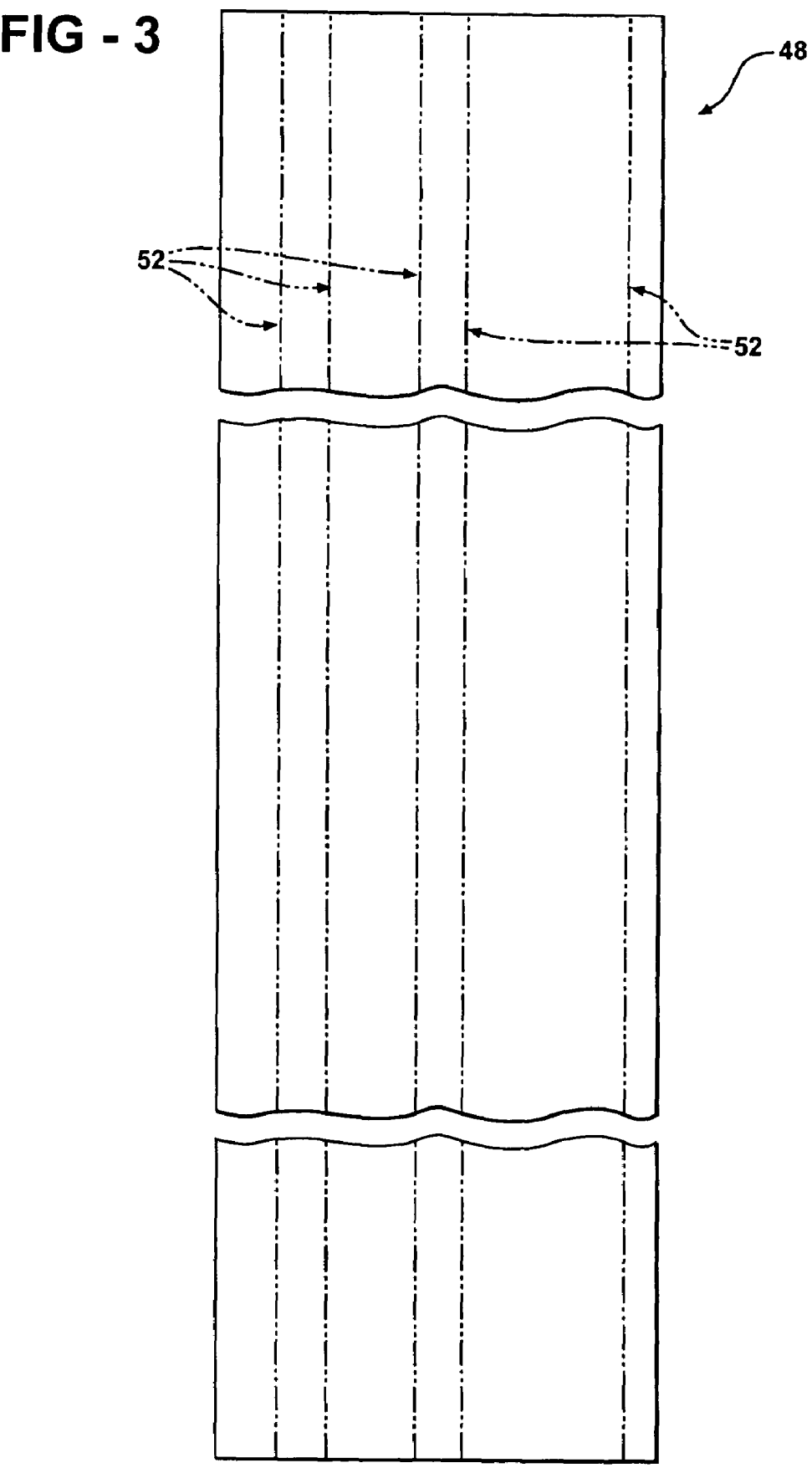
FIG. 3 is a top schematic view of a sheet of material illustrating fold lines for constructing a hollow rectangular tube.
Figure 4:
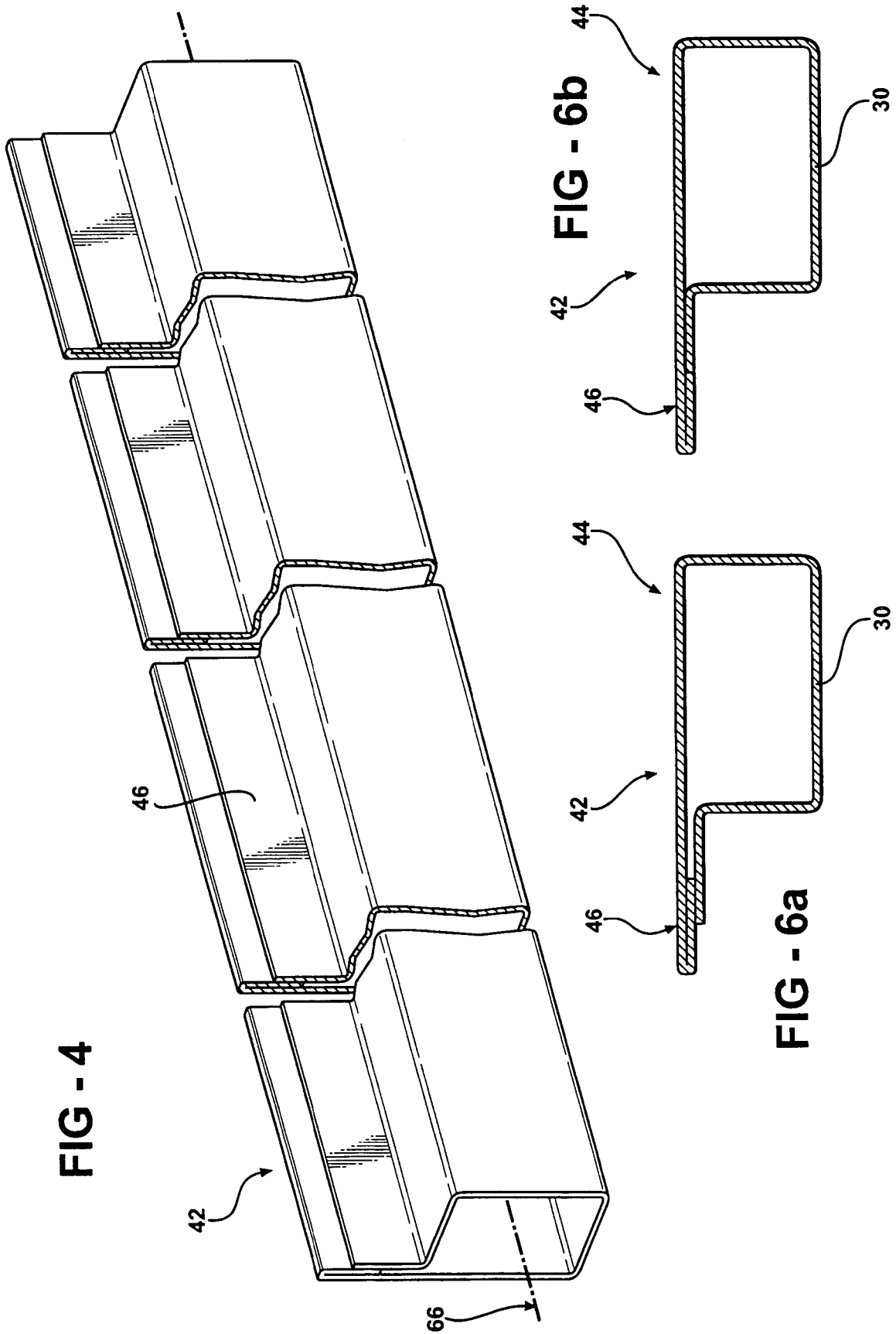
FIG. 4 is a perspective view of the hollow rectangular tube.

Referring to FIG. 4, each side 24 is preferably formed from a hollow rectangular tube 42 having a rectangular cross-section 44 and a flange 46 extending from the rectangular cross-section 44 and along the tube 42. The rectangular cross-section 44 is best illustrated in FIGS. 6a and 6b. However, the tube 42 does not have to be completely hollow and can be formed as a solid component. As shown in FIG. 3, the rectangular tube 42 is roll-formed from a sheet of material 48, such as, for example, aluminum. Other materials suitable for roll-forming can also be used. The roll-forming process folds the sheet of material 48 along various fold lines 52 and onto itself to form the tube 42 having the rectangular cross-section 44 and the flange 46. Referring to FIG. 6a, the sheet of material 48 is folded to form a lap-joint on the flange 46. Alternatively, referring to FIG. 6b, the sheet of material 48 is folded to form a butt-joint. After roll-forming the sheet of material 48 into the tube 42, the tube 42 is typically laser welded to hold the shape and provide additional stiffness to the tube 42. Additionally, other methods of forming the sides 24 can also be used, i.e., extruding, molding, etc. The sheet of material 48 can be pre-painted prior to cutting and/or roll-forming.

The tube 42 is cut to any number of required lengths to form the sides 24 of the frame 20. Referring to FIG. 8, the tube 42 is cut to form a continuous frame section 40 that includes a first frame section 36 and a second frame section 38 extending along a common axis 66. As shown in FIG. 8, the first frame section 36 extends along a first axis 54 to a first end 56 and the second frame section 38 extends along a second axis 58 to a second end 60. A first flange 62 extends laterally from the first frame section 36 and along the first axis 54 to the first end 56. A second flange 64 extends laterally from the second frame section 38 and along the second axis 58 to the second end 60.

Figure 9:
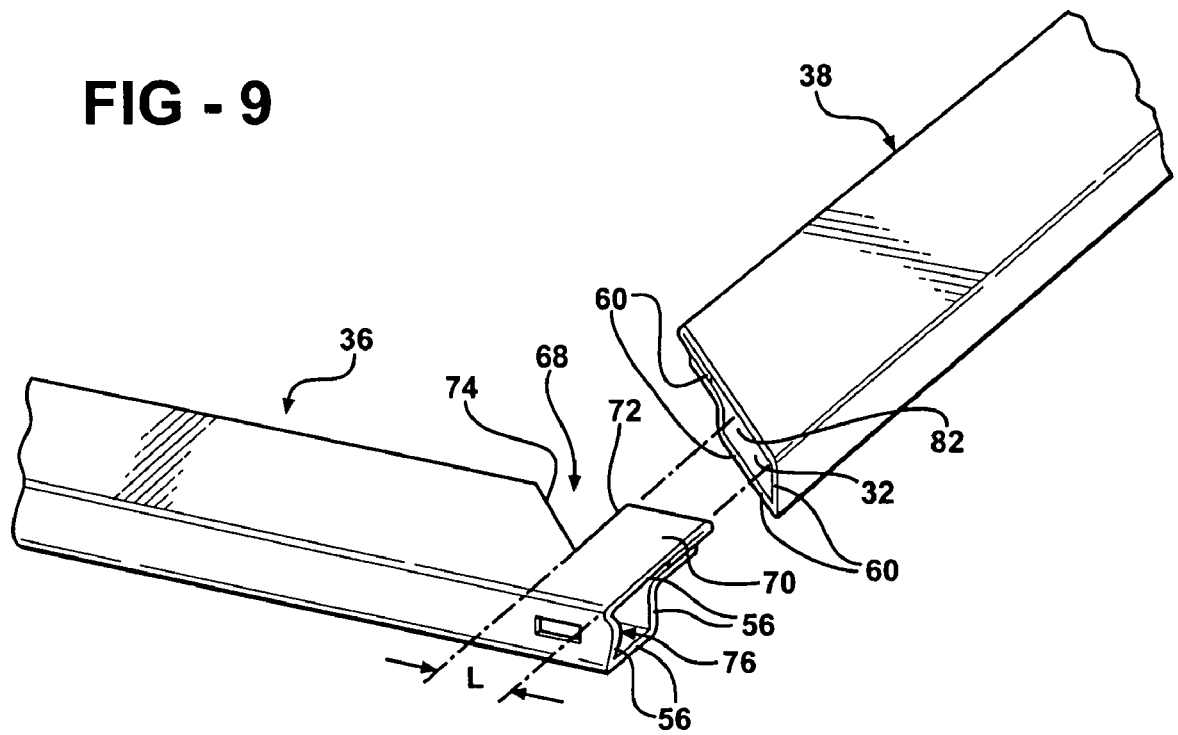
FIG. 9 is a perspective view of the first frame section and the second frame section illustrating the insertion of the flange finger into the retention opening to form the retention corner of the frame.
Figure 11:
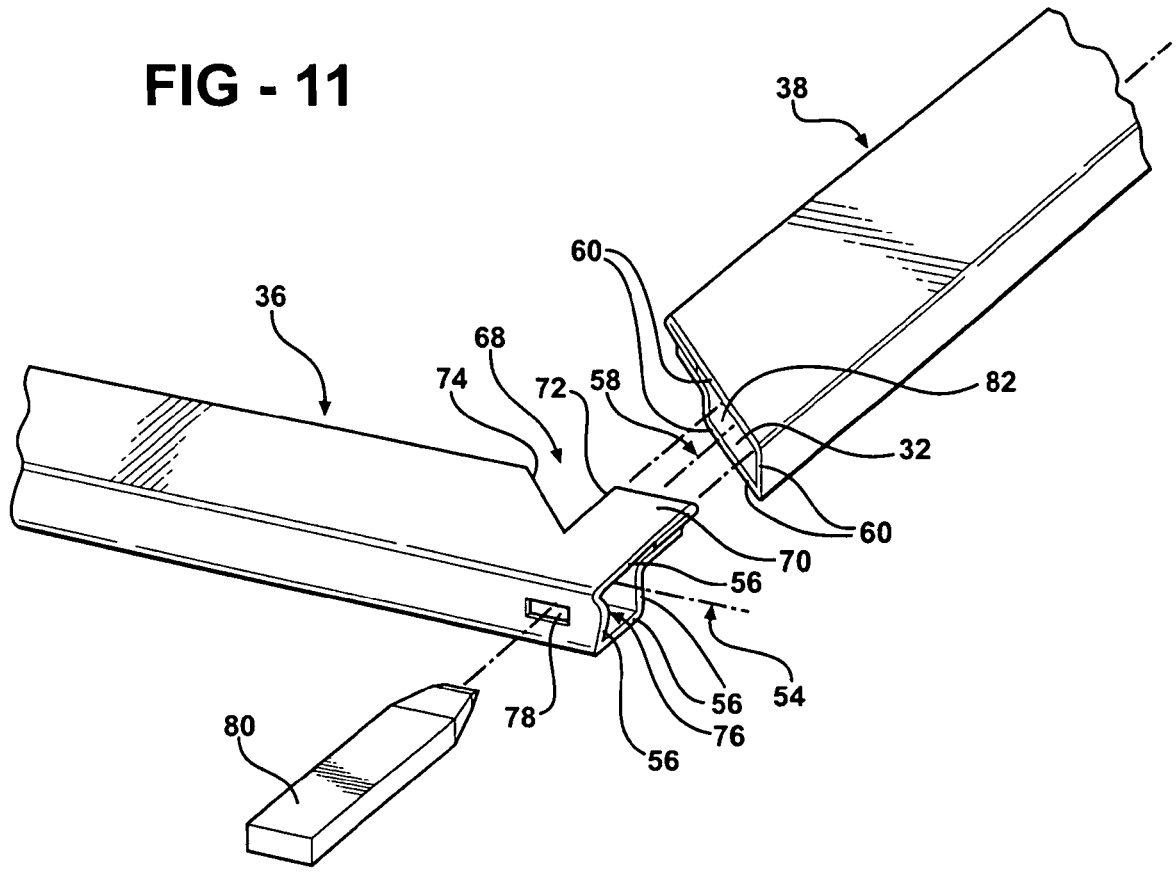
FIG. 11 is a perspective view of the first frame section and the second frame section illustrating a punch forming a pierce hole in the first frame section and further illustrating the insertion of the flange finger into the retention opening to form the retention corner of the frame.

Referring to FIG. 8, the first end 56 extends, as a plane, perpendicular to the first axis 54 across the first frame section 36 and the first flange 62. The second end 60 extends, as a plane, at an acute angle AA to the second axis 58 across the second frame section 38 and the second flange 64. A notch 68 is formed in the first flange 62, proximate the first end 56, and defines a flange finger 70 disposed between the notch 68 and the first end 56. The notch 68 includes a straight edge 72, perpendicular to the first axis 54 and parallel to the first end 56, and a mitred edge 74. The mitred edge 74 extends at a second acute angle BB to the first axis 54. Referring primarily to FIG. 9, the first frame section 36 has an insertion length L that extends between the first end 56 and the straight edge 72 of the notch 68. The first frame section 36 is gathered to provided a reduced dimension 76. To facilitate the gathering of the first frame section 36, a pierce hole 78 may be formed in the insertion length L. The pierce hole 78 is formed from a punch 80, as illustrated in FIG. 11. The formation of the pierce hole 78 by the punch 80 causes the first frame section 36 to gather. However, the reduced dimension 76 of the first frame section 36 is not limited to being formed by the pierce hole 78 or by gathering. For example, if the first frame section 36 is formed in a mold from plastic or other moldable material, the first frame section 36 can also be molded already having the reduced dimension 76.

Figure 10:
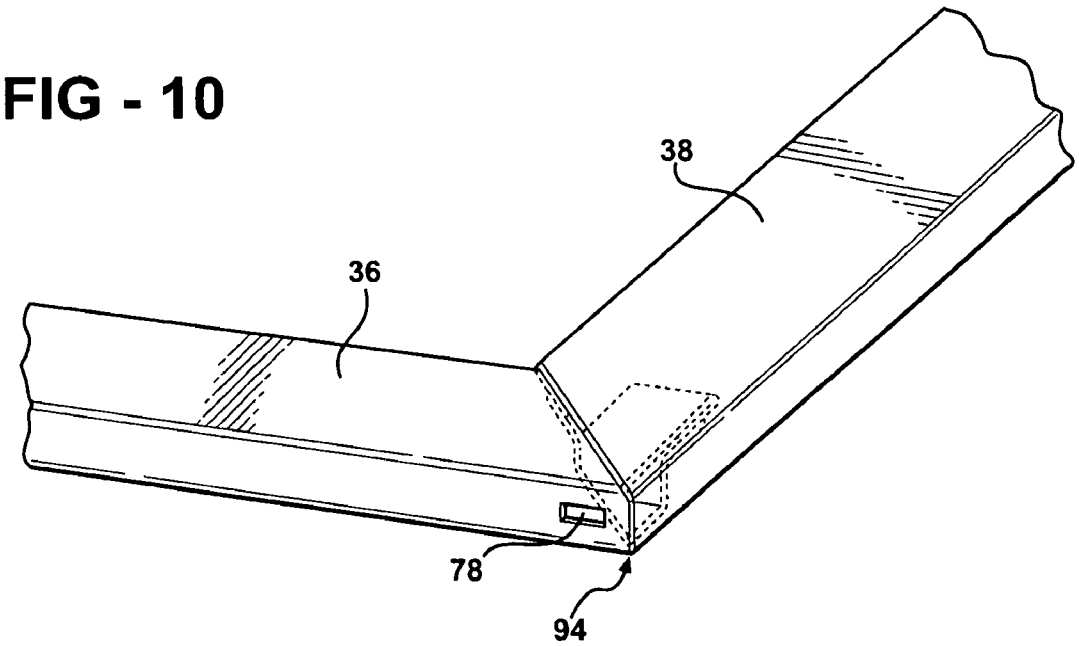
FIG. 10 is a perspective view of the retention corner of the frame with the first frame section and the second frame section connected to form the retention corner and showing in hidden lines the flange finger inserted into the retention opening.

The second end 60 defines a retention opening 32 that extends into the second end 60 of the second frame section 38. The retention opening 32 has interior dimensions 82, as shown in FIG. 9. The interior dimensions 82 allow for the insertion of the flange finger 70 and the reduced dimensions 76 into the retention opening 32, as shown in FIG. 10. Additionally, the interior dimensions 82 allow the reduced dimension 76 of the first frame section 36 to fit tightly into the interior dimensions 82 of the retention opening 32 of the second frame section 38 to provide a snug fit between the first and the second frame sections 36, 38. When the flange finger 46 and the reduced length L are inserted into the retention opening 32, the mitred edge 74 of the notch 68 abuts the second flange 64 along the acute angle AA to form a retention corner 94 between the first and the second frame sections 36, 38. The retention corner 94 typically forms a 90-degree angle between the first and the second frame sections 36, 38. However, the retention corner 94 can also be formed to be any desired angle. Therefore, the acute angle AA and the second acute angle BB would be modified appropriately so that the mitred edge 74 of the notch 68 abuts the second flange 64 along the acute angle AA at the retention corner 94. The retention corner 94 can be formed by an automated insertion by a machine or by hand. Once the retention corner 94 is formed, the first and the second frame sections 36, 38 remain connected at the retention corner 94 by virtue of the snug fit without requiring fasteners or additional steps.

Figure 5:
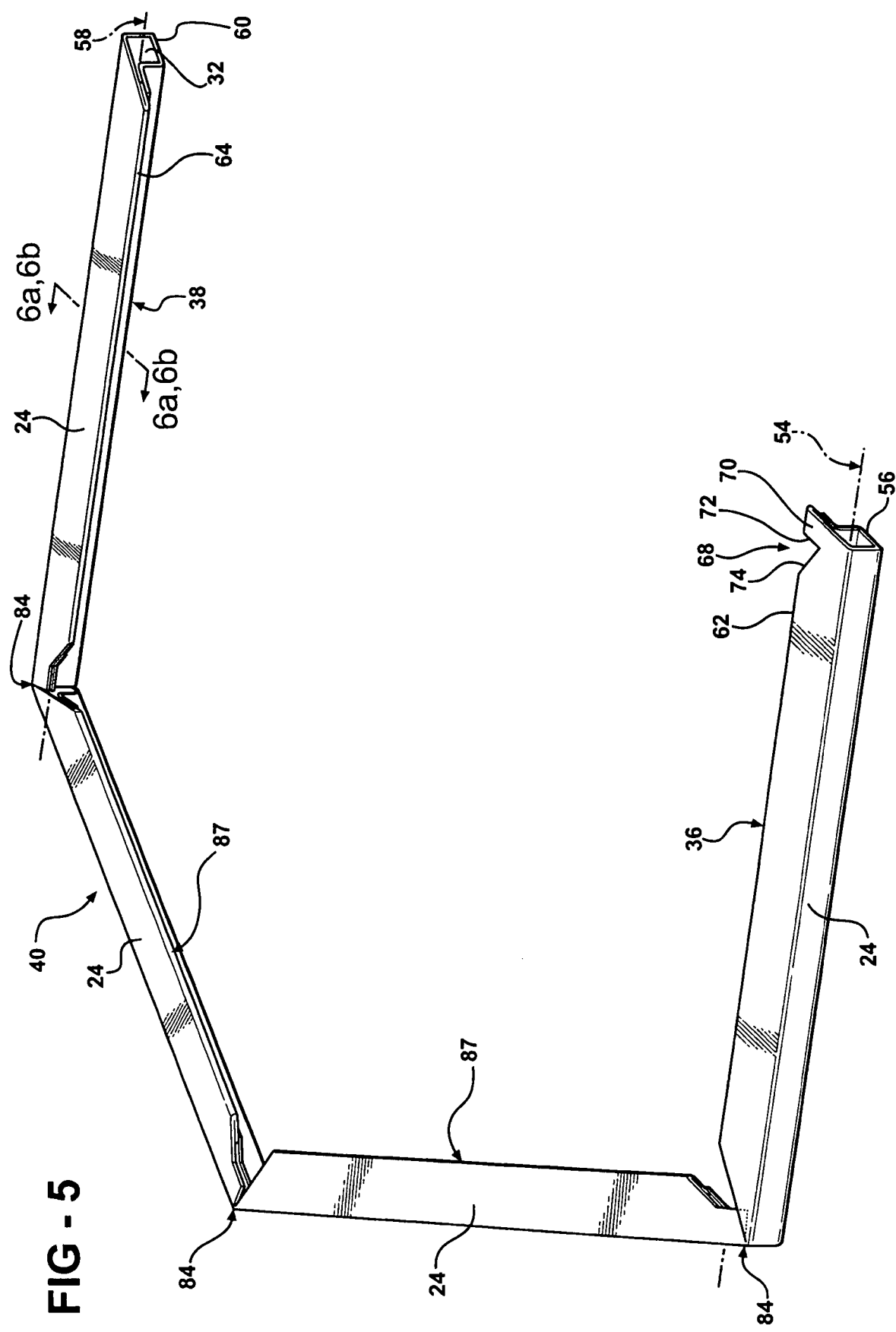
FIG. 5 is a perspective view of the hollow rectangular tube having mitre cuts and partially folded at the mitre cuts to form three fold corners of the frame.
Figure 12:
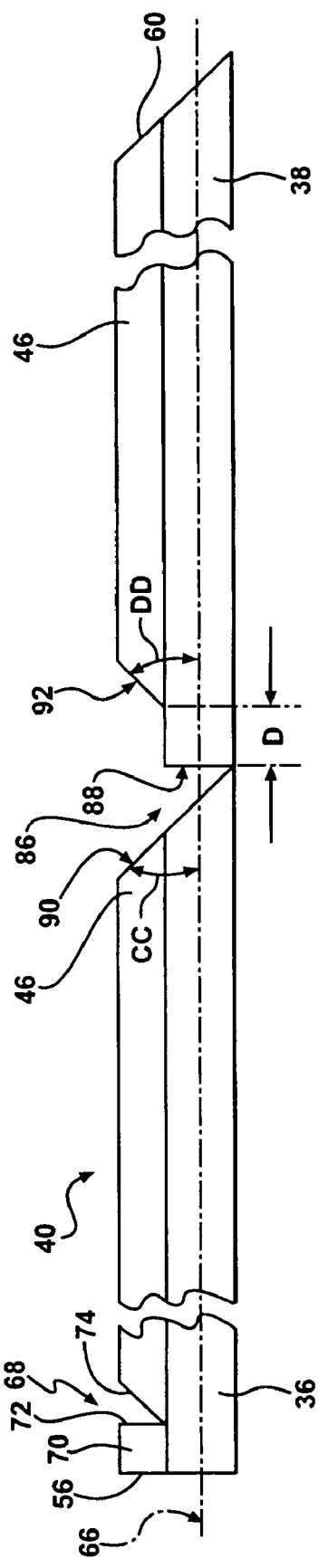
FIG. 12 is a side view of the hollow rectangular tube having a mitre recess for forming the fold corner of the frame.

Although there must be at least one retention corner 94 in the frame 20, the other corners of the frame 20 can be formed as a fold corner 84 or the retention corner 94. Referring to FIG. 12, the continuous frame section 40 extends along the common axis 66 between ends. Therefore, the first frame section 36 is disposed at one end and the second frame section 38 is disposed at the opposite end to establish the continuous frame section 40. There is a third frame section 87 adjacent one of the first and the second frame sections 36, 38 along the common axis 66. To form a fold corner 84, a mitre recess 86 is formed in the continuous frame section 40 of the tube 42 between one, or both, of the first and the second frame sections 36, 38 and the third frame section 87. The respective frame sections 36, 38, 87 are folded about the mitre recesses 86 to form the fold corner 84. That is, the fold corner 84 is integral with the continuous frame section 40. When the frame 20 has four sides 24 and is formed from a single continuous frame section 40, three mitre recesses 86 are spaced along the continuous frame section 40 between the first and the second frame sections 36, 38. The third frame section 87 is adjacent both the first frame section 36 and the second frame section 38. Preferably, the continuous frame section 40 is folded about each of the three mitre recesses 86 to form three fold corners 84, as shown in FIG. 5. Each fold corner 84 is formed between, and integral with, the two adjacent sides 24. Finally, the flange finger 70 and the reduced dimensions 76 of the first frame section 36 are inserted into and retained within the retention opening 32 of the second frame section 38 to form the retention corner 94. Once the retention corner 94 is complete, the continuous frame section 40, the retention corner 94, and the three fold corners 84 form a loop that surrounds the open space 28 of the frame 20 having four sides 24, as illustrated in FIG. 1.

Figure 13:
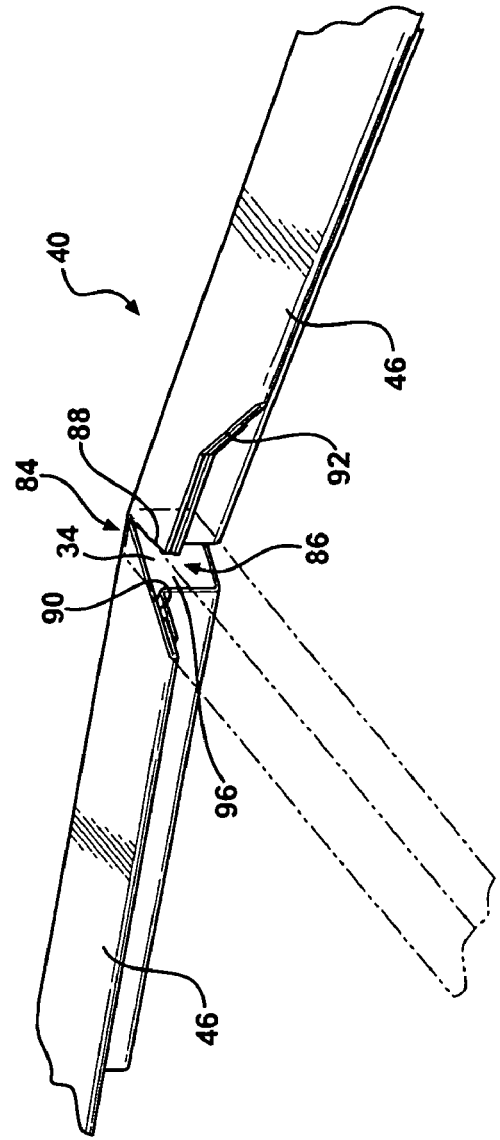
FIG. 13 perspective view of the hollow rectangular tube illustrating in broken lines the hollow rectangular tube folded about a mitre recess to form the fold corner.

The mitre recesses 86, for forming the fold corners 84, can be formed many ways, as long as the continuous frame section 40 is folded about the mitre recess 86 to form the fold corner 84. For example, the mitre recess 86 can be a V-notch where the adjacent sides 24 are folded about the mitre recess 86 to collapse the V-notch onto itself and form the fold corner 84. Another way to form the mitre recess 86, as shown in FIG. 12, is by forming a groove having a square edge 88 and a bevel edge 90 in the continuous frame section 40. With this type of mitre recess 86, the continuous frame section 40 extends along the common axis 66 and the square edge 88 extends perpendicular to the common axis 66, across the continuous frame section 40. The bevel edge 90 extends at a third acute angle CC to the common axis 66, across the continuous frame section 40 and its respective flange 46. The bevel edge 90 defines a fold opening 34, shown in FIG. 13, extending into the bevel edge 90 of the continuous frame section 40. The flange 46 is spaced from the square edge 88 at a distance D and defines a flange edge 92 extending at a fourth acute angle DD, relative to the common axis 66. The fold opening 34 has an interior size 96 and the square edge 88 has a reduced size. The reduced size allows the square edge 88 to fit within the interior size 96 of the fold opening 34. When the continuous frame section 40 is folded about the mitre recess 86, as shown in FIG. 13, the reduced size of the square edge 88 fits into the interior size 96 of the fold opening 34 with the flange edge 92 and the flange 46 along the bevel edge 90, abutting along the acute angles CC, DD to form the fold corner 84. Once all of the fold corners 84 are formed, the ends 56, 60 of the first and the second frame sections 36, 38 are joined to form the desired retention corner 94.

After the frame 20 is formed, the screen cloth 22 is attached to the frame 20. Preferably, the screen cloth 22 is adhered to the flanges 62, 64 of the various frame sections 36, 38, 87 with an adhesive. After the screen cloth 22 is adhered to the flanges 62, 64 of the various frame sections 36, 38, 87, the screen cloth 22 assists in retaining the corners 84, 94 between the various frame sections 36, 38, 87. Therefore, the retention corner 94 needs be sufficient to hold the frame 20 until the screen cloth 22 is attached.

Figure 14:
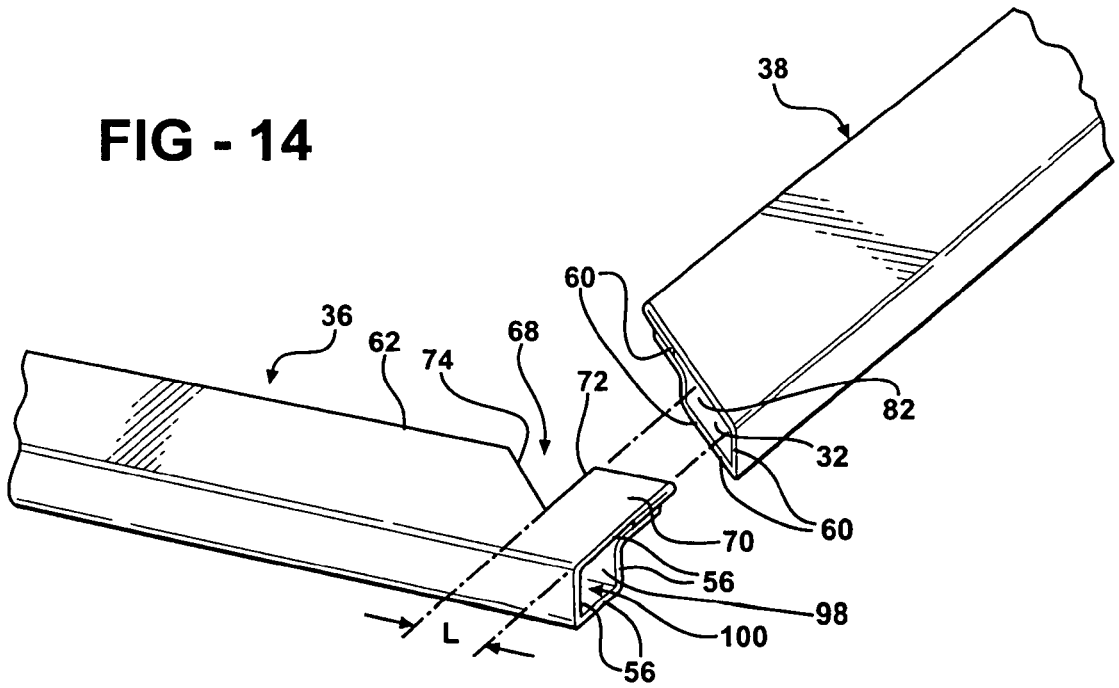
FIG. 14 is another perspective view of the first frame section and the second frame section illustrating the insertion of the flange finger into the retention opening to form the retention corner of the frame.

After the retention corner 94 is formed between the first and the second frame sections 36, 38 by inserting the flange finger 70 into the retention opening 32, as shown in FIG. 14, the retention corner 94 may optionally be further secured. The first end 56 defines an opening 100 extending into the first end 56 of the first frame section 36 and bounded on one side by a wall 98 of the first frame section 36 adjacent the first flange 62. The second frame section 64 includes a flap 102 extending from the second frame section 38 into both the retention opening 32 of the second frame section 38 and the opening 100 of the first frame section 36 for securing the first and the second frame sections 36, 38 together at the retention corner 94. The flap 102 of the second frame section 38 abuts the wall 98 of the first frame section 36 for securing the first and the second frame sections 36, 38 together at the retention corner 94. The second frame section 38 includes a puncture hole 104 and the flap 102 extends from the second frame section 38 at the puncture hole 104. The puncture hole 104 is formed with a punch 80 by piercing the puncture hole 104, as illustrated in FIG. 15, or any other type of punch. The formation of the puncture hole 104 by the punch 80 also creates the flap 102, which folds away from the puncture hole 104 and into the retention opening 32 and abuts the wall 98, as shown in FIGS. 16 and 16A. Additionally, as the puncture hole 104 is formed, the retention opening 32 of the second frame section 38 constricts about the flange finger 70 and the wall 98 of the first frame section 36 to further secure the first and second frame sections 36, 38. The flap 102 is only needed in this optional embodiment to temporarily secure the first and second frame sections 36, 38 until the screen cloth 22 is attached the frame 20.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A frame for supporting an article and comprising;
a tubular first frame section extending along a first axis to a first end,
a first flange extending laterally from said first frame section and along said first axis to said first end,
said first end extending perpendicular to said first axis across said first frame section and said first flange,
a tubular second frame section extending along a second axis to a second end,
a second flange extending laterally from said second frame section and along said second axis to said second end,
said second end extending at an acute angle relative to said second axis across said second frame section and said second flange and defining a retention opening extending into said second end of said second frame section, and
a notch in said first flange proximate said first end to define a flange finger disposed between said notch and said first end whereby a retention corner may be formed between said sections by inserting said flange finger into said retention opening of said second end, wherein said notch defines a straight edge perpendicular to said first axis and parallel to said first end.

2. A frame as set forth in claim 1 wherein said notch defines a mitred edge at a second acute angle relative to said first axis.

3. A frame as set forth in claim 2 wherein said retention opening has interior dimensions and said first frame section includes an insertion length between said first end and said straight edge of said notch and has a reduced dimension for fitting tightly into said interior dimensions of said retention opening with said mitred edge abutting said second flange along said acute angle.

4. A frame as set forth in claim 3 wherein said first frame section and said second frame section are hollow rectangular tubes and said insertion length includes a pierce hole for gathering said insertion length into said reduced dimension.

5. A frame as set forth in claim 4 wherein the distance between said straight edge of said notch and said first end fits snugly into said retention opening of said second frame section.

6. A frame as set forth in claim 1 wherein said retention corner is formed between said first and second frame sections by inserting said flange finger into said retention opening of said second end.

7. A frame as set forth in claim 6 wherein said first end defines an opening extending into said first end of said first frame section and bounded on one side by a wall of said first frame section adjacent said first flange, and said second frame section includes a flap extending from said second frame section into both said retention opening of said second frame section and said opening of said first frame section for securing said first and second frame sections together at said retention corner.

8. A frame as set forth in claim 7 wherein said flap of said second frame section abuts said wall of said first frame section for securing said first and second frame sections together at said retention corner.

9. A frame as set forth in claim 7 wherein said second frame section includes a puncture hole and said flap extends from said second frame section at said puncture hole.

10. A frame as set forth in claim 1 wherein said first and said second frame sections establish a continuous frame section extending along a common axis prior to insertion of said flange finger into said retention opening of said second end.

11. A frame as set forth in claim 10 wherein said continuous frame section comprises a third frame section adjacent one of said first and said second frame sections along said common axis.

12. A frame as set forth in claim 11 further including a mitre recess formed in said continuous frame section between one of said first and said second frame sections and said third frame section to enable folding of said frame sections about said mitre recess to form a fold corner.

* * * * *